United States Patent [19]

Bor

[11] Patent Number: 4,627,517

[45] Date of Patent: Dec. 9, 1986

[54] STAIRLIFT

[76] Inventor: Jan H. Bor, van Boeyenplantsoen 21, 2253 WS Voorschoten, Netherlands

[21] Appl. No.: 701,082

[22] Filed: Feb. 13, 1985

[30] Foreign Application Priority Data

Feb. 13, 1984 [NL] Netherlands .................. 8400458

[51] Int. Cl.⁴ ............................................. B66B 9/06
[52] U.S. Cl. ...................... 187/12; 414/595; 198/852
[58] Field of Search ............. 187/6, 7, 10, 12, 13; 198/852, 831, 321; 414/921, 595; 104/173 ST, 173 R, 172 S, 172 R

[56] References Cited

U.S. PATENT DOCUMENTS

| | | | |
|---|---|---|---|
| 3,262,550 | 7/1966 | Kampfer | 198/852 |
| 3,623,538 | 11/1971 | Wakabayashi et al. | 104/172 S |

FOREIGN PATENT DOCUMENTS

| | | | |
|---|---|---|---|
| 934690 | 10/1973 | Canada | 198/852 |
| 0043592 | 1/1982 | European Pat. Off. | |
| 2901422 | 7/1980 | Fed. Rep. of Germany | 187/12 |
| 3213774 | 10/1983 | Fed. Rep. of Germany | 187/12 |
| 3222114 | 12/1983 | Fed. Rep. of Germany | |
| 7508033 | 7/1975 | Netherlands | |
| 7804382 | 4/1977 | Netherlands | |

Primary Examiner—Joseph J. Rolla
Assistant Examiner—Kenneth Noland
Attorney, Agent, or Firm—Harness, Dickey & Pierce

[57] ABSTRACT

The invention deals with a stairlift. An endless tubular guide track 1, 2, 3 comprises two parallel rails 1, 2 one above the other and two connecting parts 3. A series of transmission elements 5 may move inside the guide track and a toothed wheel 12, driven by a motor, can engage via a groove 4 in at least the top rail 1 with an aperture 9 in each transmission element 5. A carrying platform 13 is connected to carriage 14 whose top end is attached to a roller 19 which moves inside the top rail 1, and whose bottom end is conducted relative to the outer surface of the bottom rail 2. In order to improve the stability of the carriage during the negotiation of bends, the carriage consists of a parallelogram of vertical bars 15 and crossbars 16, said crossbars 16 being hingedly connected with the vertical bars 15 about a vertical and about a horizontal axis, and the carrying platform 13 being hingedly connected with two points 26 of the crossbars 16 located more or less directly above one another.

12 Claims, 6 Drawing Figures

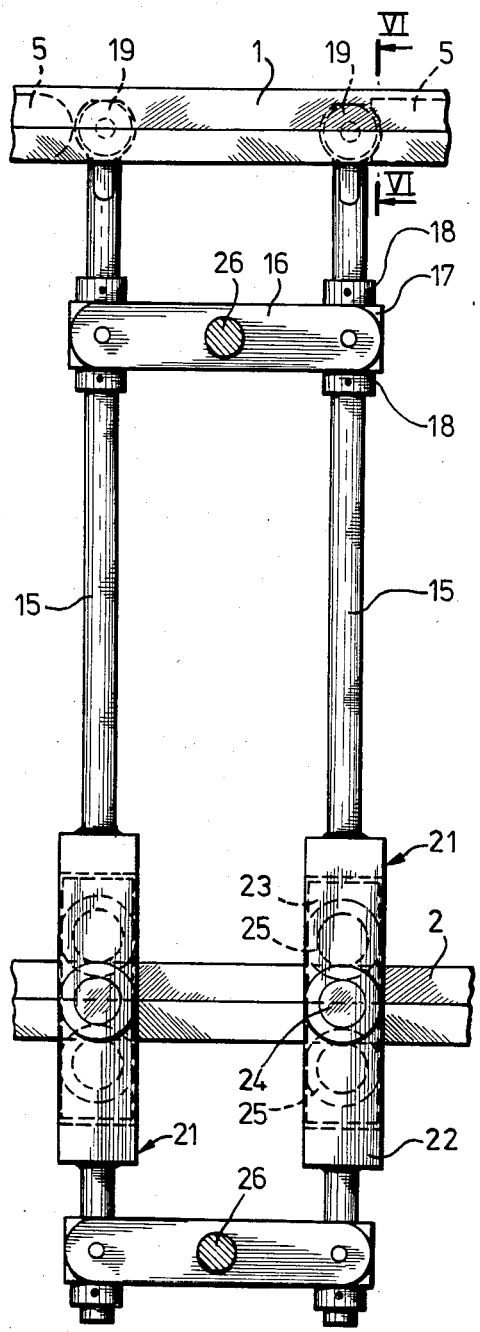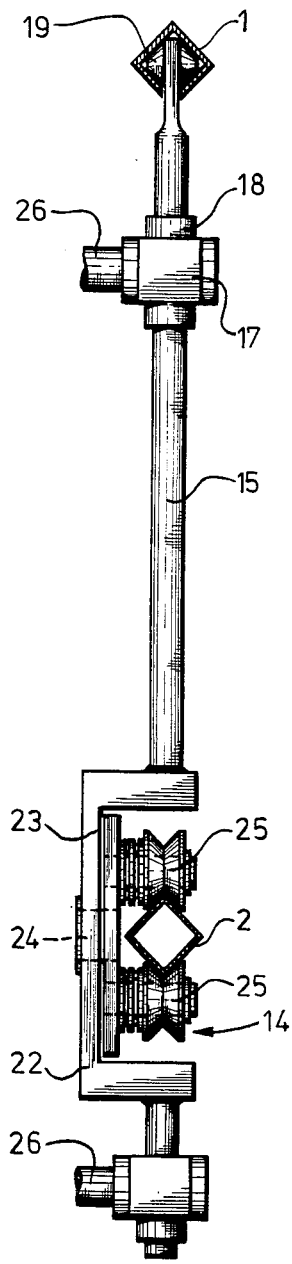

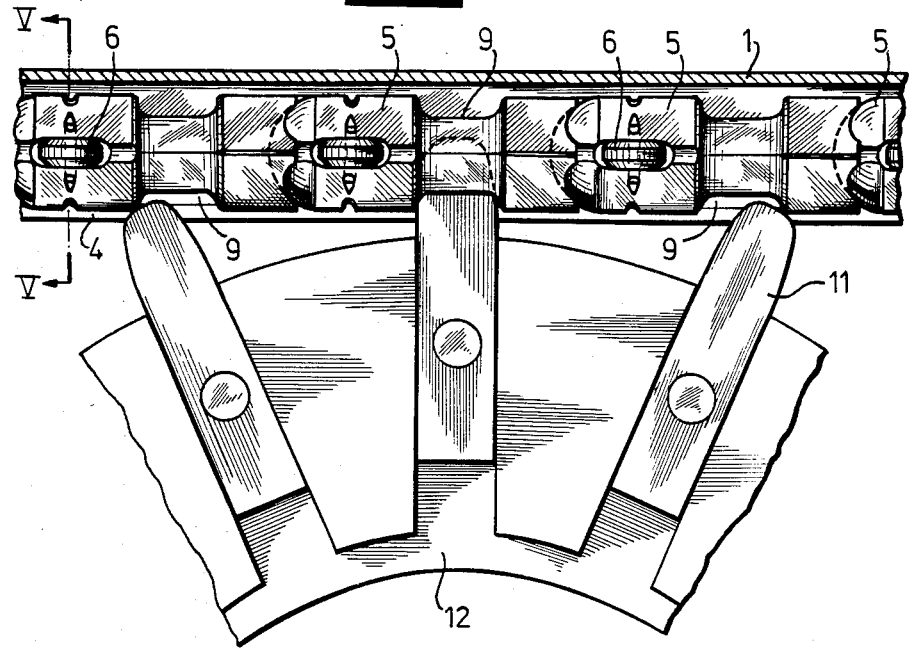
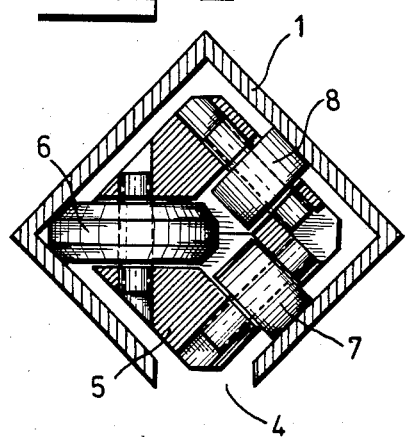
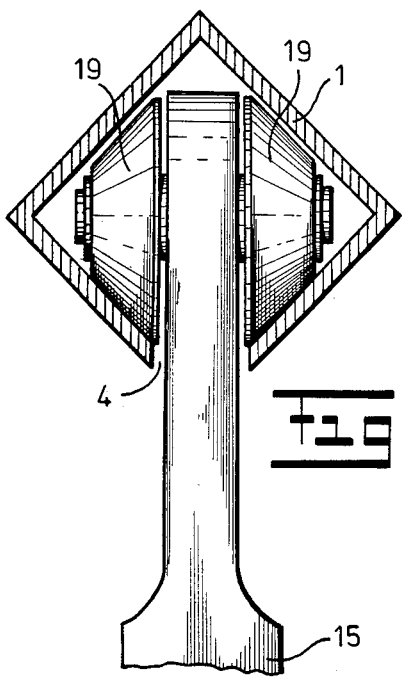

STAIRLIFT

The invention relates to a stairlift provided with an endless tubular guide track in the form of two parallel rails one above the other and two connecting parts, with at least the top rail having a groove running parallel to the centre line of the tube, a series of transmission elements inside the guide track, a toothed wheel which is driven by a motor and the teeth of which can engage via said groove with an aperture in each transmission element, and a carrying platform which is designed for carrying persons or goods and is connected to a carriage whose top end is attached to a roller or the like which moves inside the top rail, and whose bottom end is conducted by guide elements relative to the outer surface of the bottom rail.

Such a stairlift is described in Dutch Patent Application No. 7,508,033, which has been laid open for inspection. Such a lift can have a guide track running as desired in the space, in other words, the carriage with carrying platform can easily negotiate bends both in the vertical and in the horizontal plane. Said carriage, to which the carrying platform is attached, consists in the known stairlift of one single carrying bar with welded-on attachment lugs. With such a design, the position of the carriage will be relatively unstable during the negotiation of bends; in order to make the carriage run smoothly, a relatively large amount of clearance is required.

The object of the invention is to eliminate this problem, and to this end the stairlift mentioned in the preamble is characterised in that the carriage consists of a parallelogram of vertical bars and crossbars, said crossbars being hingedly connected with the vertical bars about a vertical and about a horizontal axis, and in that the carrying platform is hingedly connected with two points of the crossbars located more or less directly above one another.

The parallelogram provides a sturdy and stable support for the carrying platform. Bends in the horizontal and in the vertical plane can be negotiated smoothly.

A very sturdy design—which is not so susceptible to breakdowns—of the guide elements with which the bottom end of each of the vertical parallelogram bars is conducted relative to the bottom rail comprises a vertical yoke, a bearing plate hingedly connected with it, and two rollers mounted one above the other relative to that plate which grip the top and bottom half of the bottom rail respectively.

The guide track and the transmission elements are preferably rectangular in cross section. Such a shape of the guide track is aesthetically justified and gives a good hold for those walking up or down the stairs.

Each transmission element is expediently provided with rollers in a rib of the square cross section and in the two faces opposite that rib.

The transmission elements are not connected to one another, but link up with one another. In order to ensure smooth movement of the series of transmission elements on bends, it is preferable for each of the transmission elements to be provided at one end with a concave head and at the other end with a complementary convex head. Such a design shows very little wear.

The invention will now be explained with reference to the drawings which illustrate an embodiment.

FIG. 2 shows a side view of the carriage of the stairlift.

FIG. 3 shows a front view of this carriage.

FIG. 4 shows in cross section a detail of the drive of the lift.

FIG. 5 shows a cross section along the line V—V in FIG. 4, on a larger scale.

FIG. 6 shows a cross section along the line VI—VI in FIG. 2, on a larger scale.

Figure 1:
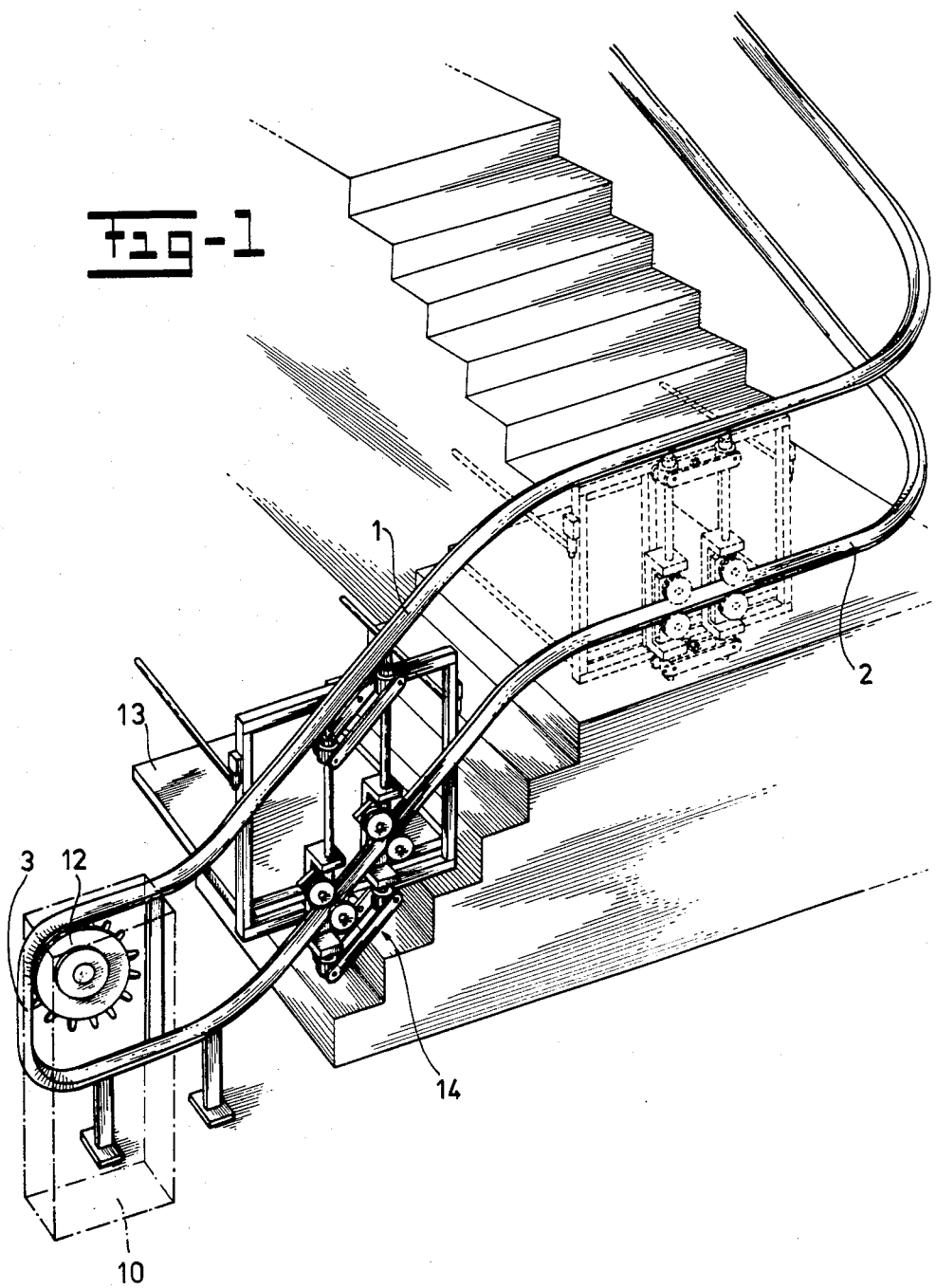
FIG. 1 is a perspective drawing of a stairlift according to the invention.

The stairlift illustrated comprises an endless guide track in the form of a top rail 1, a bottom rail 2 and connecting parts 3. The guide track is designed as a tube with a square cross section, with a groove 4 being recessed in the bottom part of the square.

The tubes 1 and 2 extend parallel to one another and can have bends in the vertical and the horizontal plane. Inside the guide track is a series of connecting, but not connected, transmission elements 5 with a concave head at one end and a complementary convex head at the other end (see FIG. 4). The transmission elements are also square in cross section. Fitted at one of the ribs of the square there is a relatively large roller 6, while in two faces opposite that rib relatively small rollers 7, 8 are mounted (FIG. 5).

Each transmission element also has an aperture 9 (FIG. 4) which can be engaged by a tooth 11 and a toothed wheel 12. By rotating the toothed wheel 12 by means of a drive unit 10, one can shift the whole series of engaging transmission elements 5 in the closed track.

A carrying platform 13 for the carriage of goods or persons has a connection with a carriage 14, provided with two vertical bars 15 which for the formation of a parallelogram are connected to crossbars 16 in such a way that pivoting about both a vertical and a horizontal axis is possible. To this end, each crossbar 16 is hingedly connected about a horizontal axis with a box 17 in which the vertical bars 15 can rotate. The boxes 17 are held in place by sleeves 18.

As can be seen from FIGS. 3 and 6, fitted at the top end of both vertical bars 15 are two tapered rollers 19 which can roll inside the top rail 1 and locally interrupt the row of transmission elements 5.

Relative to the bottom rail 2 each vertical bar is guided by a guide construction 21 consisting of a vertical yoke 22, a bearing plate 23 which at 24 is hingedly connected with that yoke, and two rollers 25 located one above the other which are supported relative to the bearing plate 22 and engage with the top half and the bottom half of the bottom rail 2 respectively.

The carrying platform 13 is connected by means of link pins to the centre 26 of the crossbars 16.

During negotiation of a bend both in the vertical and in the horizontal plane, the supporting face of the carrying platform 13 will therefore also retain its horizontal position, for the connecting line between the centres 26 remains vertical. During negotiation of a bend in the horizontal plane, the crossbars 16 and the vertical bars 15 will rotate about a vertical axis relative to each other.

The parallelogram-shaped carriage described is a very stable suspension element for the carrying platform 13. The clearance in the system can be limited to a minimum. The design of the transmission elements 5 with the three rollers 6, 7, 8 also contributes to the stability and strength. As a result of the complementary concave and convex ends of the transmission elements 5, little wear occurs, and the movement can be very smooth.

The guide tracks 21 produce very reliable and firm guidance of the bottom side of the carriage.

Various modifications of the design described and illustrated are possible within the framework of the claims.

I claim:

1. Stairlift provided with an endless tubular guide track in the form of two parallel rails one above the other and two connecting parts, with at least the top rail having a groove running parallel to the center line of the tube, a series of transmission elements inside the guide track, a toothed wheel which is driven by a motor and the teeth of which can engage via said groove with an aperture in each transmission element, and a carrying platform which is designed for carrying persons or goods and is connected to a carriage whose top end is attached to a roller or the like which moves inside the top rail, and whose bottom end is conducted by guide elements relative to the outer surface of the bottom rail, characterized in that the carriage consists of a parallelogram of vertical bars (15) and crossbars (16), and crossbars (16) being hingedly connected with the vertical bars (15) about a vertical and about a horizontal axis, and in that the carrying platform (13) is hingedly connected with a point on each (26) of the crossbars (16) located more or less directly above one another.

2. Stairlift according to claim 1, characterised in that the guide elements (14) with which the bottom end of each of the vertical parallelogram bars (15) is conducted relative to the bottom rail (2) comprise a vertical yoke (22), a bearing plate (23) hingedly connected with it, and two rollers (25) mounted one above the other relative to that plate, which grip the top and the bottom half of the bottom rail (2) respectively.

3. Stairlift according to claim 2, characterised in that the guide track (1,2,3) and the transmission elements (5) are rectangular in cross section.

4. Stairlift according to claim 3, characterised in that each of the transmission elements (5) is provided with rollers (6,7,8) in a rib of the square cross section and in the two faces opposite that rib respectively.

5. Stairlift according to claim 4, characterised in that each of the transmission elements (5) is provided at one end with a concave head and at the other end with a complementary convex head.

6. Stairlift according to claim 3, characterised in that each of the transmission elements (5) is provided at one end with a concave head and at the other end with a complementary convex head.

7. Stairlift according to claim 2, characterised in that each of the transmission elements (5) is provided at one end with a concave head and at the other end with a complementary convex head.

8. Stairlift according to claim 1, characterised in that the guide track (1,2,3) and the transmission elements (5) are rectangular in cross section.

9. Stairlift according to claim 8, characterised in that each of the transmission elements (5) is provided with rollers (6,7,8) in a rib of the square cross section and in the two faces opposite that rib respectively.

10. Stairlift according to claim 9, characterised in that each of the transmission elements (5) is provided at one end with a concave head and at the other end with a complementary convex head.

11. Stairlift according to claim 8, characterised in that each of the transmission elements (5) is provided at one end with a concave head and at the other end with a complentary convex head.

12. Stairlift according to claim 1 characterised in that each of the transmission elements (5) is provided at one end with a concave head and at the other end with a complementary convex head.

* * * * *